(12) United States Patent
Cardone et al.

(10) Patent No.: US 6,292,078 B1
(45) Date of Patent: Sep. 18, 2001

(54) MANUALLY CONTROLLED MAGNETIC ANCHORING DEVICE

(75) Inventors: Michele Cardone; Antonino Giglio, both of Milan (IT)

(73) Assignee: Tecnomagnete S.p.A, Milan (IT)

( * ) Notice: Subject to any disclaimer, the term of this patent is extended or adjusted under 35 U.S.C. 154(b) by 0 days.

(21) Appl. No.: 09/485,729

(22) PCT Filed: Jun. 9, 1999

(86) PCT No.: PCT/EP99/03971

§ 371 Date: Feb. 15, 2000

§ 102(e) Date: Feb. 15, 2000

(87) PCT Pub. No.: WO99/65644

PCT Pub. Date: Dec. 23, 1999

(30) Foreign Application Priority Data

Jun. 15, 1998 (IT) ............................................... MI98A1356

(51) Int. Cl.$^7$ ............................................................... H01F 7/04
(52) U.S. Cl. ............................ 335/295; 335/288; 269/8; 294/65.5
(58) Field of Search ....................................... 335/285–295; 269/8; 294/65.5

(56) References Cited

U.S. PATENT DOCUMENTS 2,280,437 * 4/1942 Levesque ............................. 335/295
5,166,654   11/1992 Doyelle .................................. 335/288

FOREIGN PATENT DOCUMENTS 2038677   1/1971 (FR) .

\* cited by examiner

*Primary Examiner*—Ramon M. Barrera
(74) *Attorney, Agent, or Firm*—Young & Thompson

(57) ABSTRACT

A manual magnetic anchoring device includes a monolithic ferromagnetic block, whereon a housing for stator magnets, a housing for a rotor core, a ferromagnetic crown for short circuiting of the magnetic flux during deactivation of the anchoring device, and at least a first and a second collector pole defining a working surface for anchoring a ferrous part are formed in one single piece.

16 Claims, 4 Drawing Sheets

MANUALLY CONTROLLED MAGNETIC ANCHORING DEVICE

BACKGROUND OF THE INVENTION

The present invention relates to a manually controlled magnetic anchoring device by means of which ferrous parts can be clamped. In particular, in the description which follows, we will refer to an anchoring device intended to act as a magnetic hoist for loads even high in weight, without thereby forming a limitation to the field of application of the requested patent, given that such a device can be used for example also for restraining a ferrous workpiece in a predetermined position.

DESCRIPTION OF THE RELATED ART

According to the inventor the most efficient model of magnetic hoist in the relevant known state of the art is that formed by two permanent magnetic cores, whereof one core can be inverted manually through approximately 180 degrees and henceforth shall be defined as rotor core, and the other is a stator core normally divided into two or more parts and henceforth shall be defined stator core.

The aforesaid rotation will dispose the magnetic field of the rotor core alternatively in repulsion or attraction with the magnetic field generated by the stator core. In the first case the working zone of the hoist will be activated, in the second case, by disposing the two magnetic cores in reciprocal attraction, the working zone will be demagnetised.

Both in the active and passive phase said hoist uses ferromagnetic components which form both the conductor poles for activating the working zone and the external short circuiting yoke of the stator core.

The hoist device described hitherto has serious constructional problems.

It is in fact formed by various components which are to be machined separately and then assembled by means of a plurality of screws and/or welds.

Despite all the work of careful assembly such a device has the undoubted disadvantage of not tolerating excessive mechanical stresses, with the risk of misalignment of the active work surface defined by the two collector poles and a consequent functional and performance deterioration.

Another penalising aspect is apparent, during the phase of activation of the hoist, due to the high dispersion of the magnetic flux which occurs mainly through the four lateral surfaces of the magnetic poles, generally in the form of a parallelepiped. Due to the perfect isotropy of steel, which is the material forming the collector poles, the quantity of magnetic flux, contained inside the pole and suitable for crossing the collector poles and then closing on the part to be hoisted, and which disperses outwards, is higher the larger the total surface of the pole directly exposed to the air.

SUMMARY OF THE INVENTION

The object of the present invention is thus that of providing a magnetic anchoring device which avoids the disadvantages mentioned above and namely that of providing a magnetic hoist which during activation reduces to a minimum the dispersion of magnetic flux linked to the collector poles, and which at the same time is solid and robust in such a way as to improve efficiency and offer a high standard of performance.

Another object of the present invention is that of providing a magnetic anchoring device which, on a par with the magnetic material used, generates a higher magnetic power although allowing its weight and hence overall dimensions to be reduced.

A further object of the present invention is that of providing a magnetic anchoring device with a simple structure and whose parts do not require precision machining, which are long and complex or in any case such as to make it expensive.

Finally an object of the present invention is that of providing a versatile, practical, easy to handle and convenient use magnetic anchoring device.

These objects are achieved with a manual magnetic anchoring device in accordance with the claims listed below.

In the magnetic anchoring device according to the present invention a monolithic ferromagnetic block is provided which defines laterally and above the neutral crown or yoke for short circuiting of the stator core, and below the two collector poles or pole pieces. While two grooves branch off from the opposite lateral walls of the monolithic block, extending inwards to house the stator core, on the front wall of the monolithic block a substantially circular opening is formed which penetrates longitudinally inwards to house the reversible rotor core. Advantageously this monolithic block solution produces a mechanically resistant device. Thanks to the material continuity between the pole pieces and the neutral crown, there are no points of attachment, by means of screws or the like, which in the traditional embodiment do not offer complete reliability given that around them the forces arising from accidental and unexpected stresses of a dynamic nature are preferably concentrated, including above all vibrations or impact, and arising from expected stresses due to transients of activation or inhibition of the hoist and to the weight of the load to be hoisted.

The spaces for housing the stator and rotor cores are formed through milling of the monolithic block; this type of machining is fast, practical, simple, economical and convenient to the extent wherein it allows a single multi-use finished product to be obtained from an unmachined monolithic block, comprising not only, as mentioned, the grooves for housing the stator and rotor cores, but also the neutral crown and the two pole pieces. The advantages achieved in this case are even more evident if we consider that, traditionally, the neutral crown and the two pole pieces, being intended for different purposes, are machined separately and at times even require separate machining processes.

In an extremely advantageous manner the rotor core is inserted in a respective housing formed in one single piece, thus further reducing the number of parts of the device.

Since it is not possible for constructional and functional reasons to eliminate completely the losses of flux distributed along the whole magnetic circuit, it has however been possible to restrict them considerably during activation of the hoist, finding an optimal and extremely convenient arrangement of the stator and rotor cores and conferring on the magnetic collector poles a new shape which allows one of the four lateral surfaces to be eliminated which, traditionally, tend to disperse the flux.

More particularly the two magnetic collector poles are approximately defined by the portions of the monolithic ferromagnetic block enclosed between the stator and rotor cores, while the work surface is defined by the two end and coplanar surfaces of the above mentioned portions of the monolithic block.

BRIEF DESCRIPTION OF THE DRAWINGS

These and other features of the present invention will be illustrated in greater detail in the preferred embodiments of the invention described hereinunder, referring to the accompanying drawings, in which.

Figure 1:
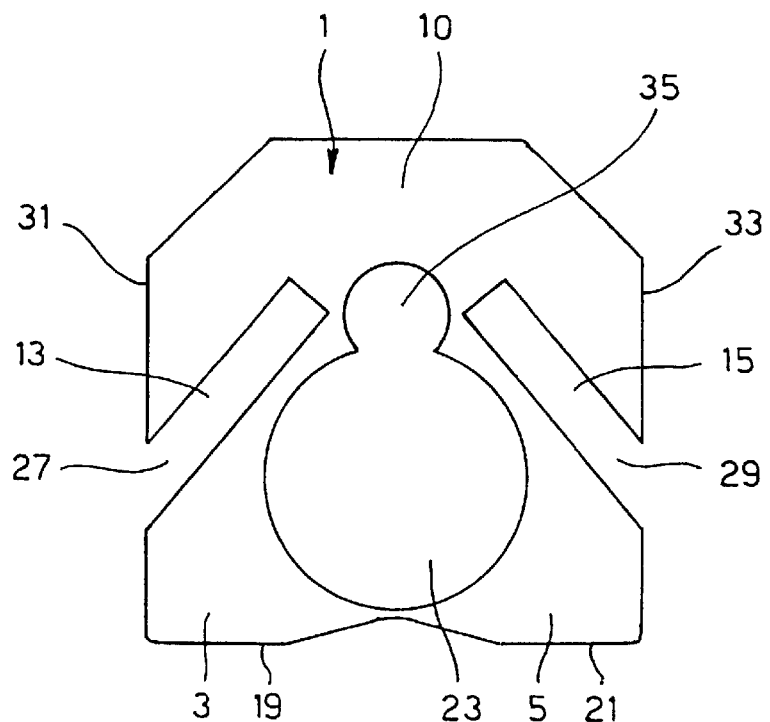
FIG. 1 is a cross section of the monolithic block for housing the stator and rotor cores according to a first embodiment of the invention.

In the first embodiment shown in FIGS. 1, 3, 4a, 4b, 5a and the two portions of the monolithic ferromagnetic block 1, substantially enclosed between the housings 13 and 15 of the stator magnets 17 and the housing 23 of the rotor core 25, define two pole pieces 3 and 5 extending towards the part to be hoisted (not shown) which is anchored at the work surface outlined by the lower surfaces 19, 21 of the pole pieces 3 and 5 respectively.

The housings 13 and 15 of the stator magnets are formed by grooves originating from longitudinal openings 27 and 29 formed on opposite lateral surfaces 31 and 33 of the monolithic block 1 and extending symmetrically and with a certain slant towards its interior.

Figure 6:
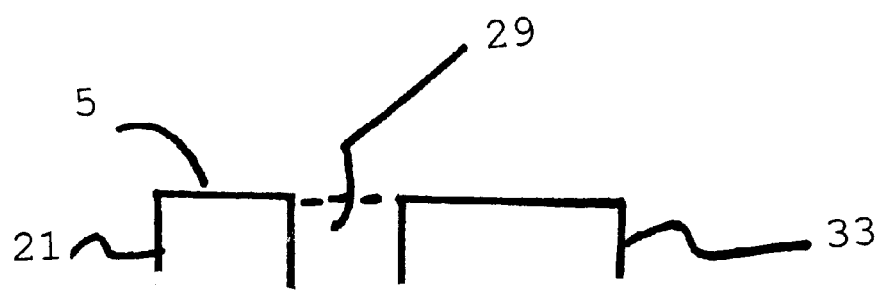
FIG. 6 is a partial side view of another embodiment of the monolithic block.

FIG. 6 shows a partially side view of the upper portion of block 1 as seen from the pole piece 5 side. The pole piece 3 side is similar.

The housing 23 for the rotor core 25 is formed by a groove with a circular section, formed starting from a central portion of the front wall of the monolithic block 1, and extends longitudinally and horizontally towards the interior of the same block 1.

Parallel to the housing 23 another groove 35 extends, whose cross section is also circular but smaller compared to that of the housing 23. The lower part of the groove 35 leads into the upper part of the housing 23.

Inside the housing 23 the magnetic rotor core 25, with a cylindrical structure, is housed, supported rotatingly by two pins 69 and 71 around its longitudinal axis and magnetised in a direction at right angles to said longitudinal axis. In particular the rotor core 25 comprises: a ferromagnetic cylindrical body 37, longitudinally traversed by a through groove 39 with a rectangular cross section, formed along a diameter of the circular section of the cylinder 37 to define two caps 45, which caps 45 are connected integrally via bridges formed by two small disks 43 obtained during the preliminary operations of turning of the opposite bases of the cylindrical body 37 of the rotor core 25, and a permanent magnetic element 49 adapted to the housing 39.

Minimisation of the parts which make up the device, in this case obtained by providing the monolithic block 1 and reducing to two the separate components of the rotor core, contributes to making the overall system extremely solid, above all due to the substantial decrease in welding points and/or connections with screws or the like, and the performances can as a result be raised considerably.

The groove 35 minimises the passage section for this part of magnetic flux which during activation of the device try to close itself through the ferromagnetic portion of the block 1 comprised between the inner ends of the stator housings 13 and 15.

Figure 2:
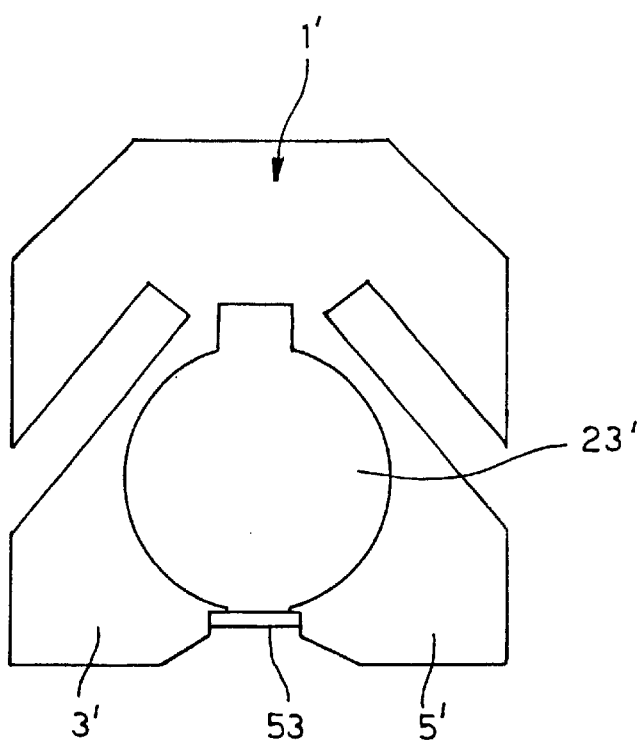
FIG. 2 is a cross section of the monolithic block for housing stator and rotor cores in accordance with a second embodiment of the invention.

FIG. 2 shows an alternative embodiment of a block 1', again monolithic but providing the two pole pieces 3' and 5' laterally disjoined, between which a spacer 53 in a non-magnetic material, generally aluminum, is placed.

Without the device departing substantially from the general principles claimed by this invention, a rotor core can also be devised, obtained simply by placing a permanent magnetic element between two separate polar caps whereto it is then attached by known means.

Figure 3:
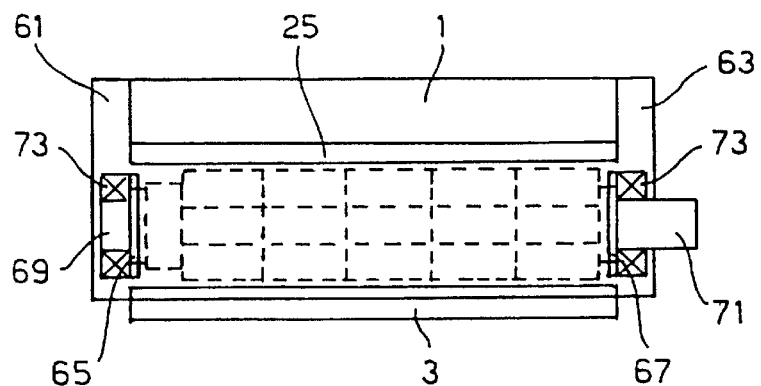
FIG. 3 is a reduced longitudinal view of the hoist according to the first embodiment of the invention.
Figures 5A, 5B:
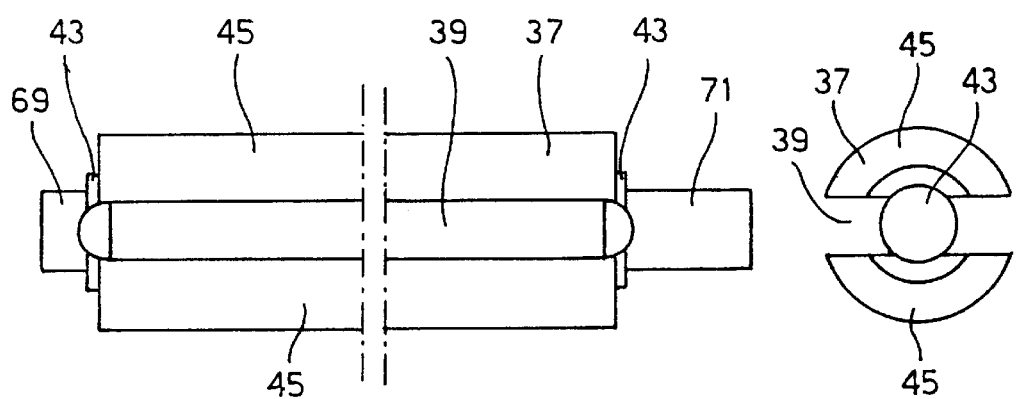
FIGS. 5a and 5b are front and longitudinal views, of the rotor body of the first embodiment of the invention.

In FIG. 3 covers 61 and 63 respectively in aluminum close the overall structure of the hoist at the front and rear.

Two flanges 65 and 67, screwed to the opposite longitudinal ends of the aforementioned semi-cylindrical caps, support two respective pins 69 and 71 defining the longitudinal axis of rotation of the rotor core 25. Said pins 69 and 71 are supported to rotate by ball bearings 73 held in special housings formed in the closure covers 61 and 63. On the end of the pin 71 projecting from the closure cover 63 a control lever 75 is also mounted.

The stator magnets 17 are composed of two identical magnetic elements with a substantially rectangular plan, held in the respective housings 13 and 15 and magnetized in a direction at right angles to the larger axis.

Figure 4A:
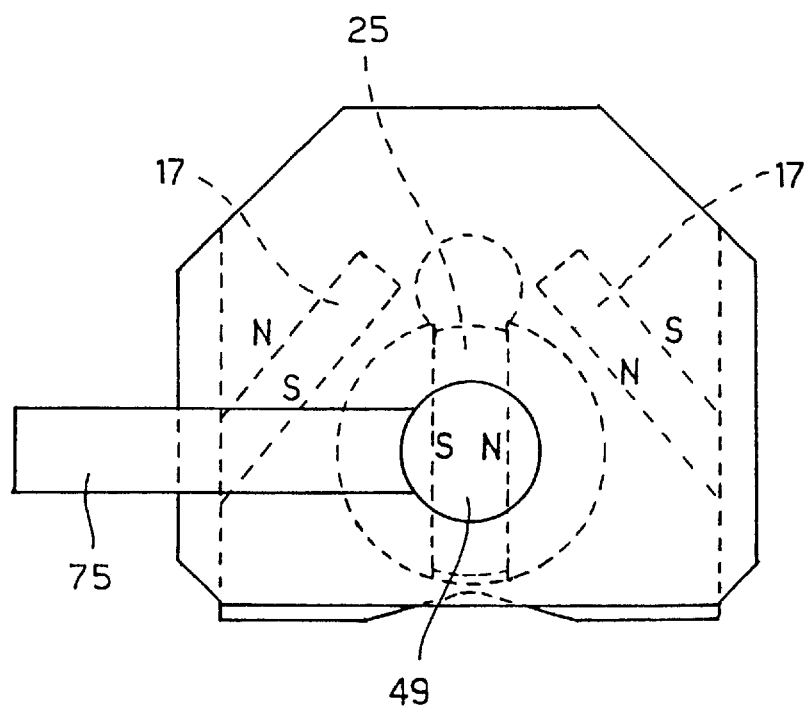
FIGS. 4a and 4b are front views, with the manual control lever in the position of activation and inhibition of the hoist of the first embodiment of the invention.

In order to activate the magnetic hoist it is necessary to rotate in an anticlockwise direction the control lever 75 as far as an angle of 180 degrees in relation to the horizontal starting position, as can be seen in FIG. 4a. By this procedure the poles (denoted by n, i.e. north pole, and s, i.e. south pole) of the same sign of the rotor core 25 and stator magnets 17 are brought together, which poles of the same sign deviate the magnetic flux towards the lower ends of the pole pieces 3 and 5 and thus lead it to close through the part to be hoisted.

Figure 4B:
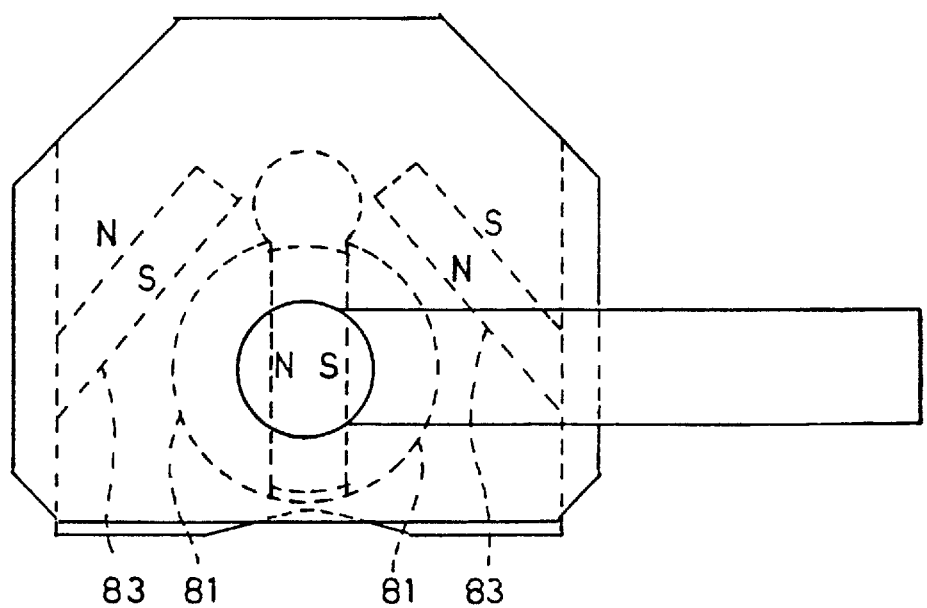

Contrarily, if the control lever 75 is returned into the original position shown in FIG. 4b, the re-approaching of the poles of opposite sign of the stator core 17 and rotor core 25 is sufficient for closing the magnetic flux through the lateral and upper portion of the monolithic block 1, defining an actual ferromagnetic short circuiting crown 10, and therefore the hoisted part is totally excluded from the magnetic circuit and can therefore be released.

In order to commutate the hoist with rotations of the control lever 75 of less than 180 degrees and make control of the device by the user more convenient and manageable, the magnet 49 can be designed in such a way as to generate a higher magnetic power than that generated by the magnets 17 by just enough to achieve commutation for small angles of rotation of the control lever 75 without however increasing excessively the dispersion of the flux and therefore worsening the performances of the device itself. This can be carried out indiscriminately, using for the magnets 17 and for the magnet 49 two different component materials or two different quantities of the same material.

More specifically the correct choice of the type or of the quantity of material to be used must also take account of the fact that the surfaces 81 and 83 of the rotor and stator cores respectively which border the pole pieces 3 and 5 are of different extent. This arises from the fact that, as already briefly anticipated, in order to minimize dispersion of the magnetic flux, the shape of the collector poles 3 and 5 seen frontally must appear roughly similar to a triangle, the sides of which triangle facing the rotor magnet 49 and magnets 17 are necessarily of different length.

Thus material with a high magnetic power per surface unit can be chosen, typically neodymium, for the magnet 49, and other materials, typically ceramic, with lower specific magnetic power, for the magnets 17.

The same intent according to another embodiment can be achieved by adopting a mixture of different magnetic materials, based on ceramics, neodymium or AlNiCo in varying proportions both for the magnets 17 and the magnet 49.

The careful limitation of the dispersion of magnetic flux together with the intrinsic structural solidity of the device as devised in the present embodiment has allowed it finally, on a par with the performances available, to achieve an enormous reduction in the overall dimensions and above all in the total weight.

More particularly different magnetic materials from those mentioned above can be used.

The housings 13 and 15 of the stator magnet 17 can also be made with various slopes, and housings arranged horizontally can at most also be foreseen, and at various heights on the lateral walls of the monolithic block 1, see FIG. 6.

Naturally it is understood that the preferred embodiment described above of the manual magnetic hoist must not limit the principle claimed.

What is claimed is:

1. A manual magnetic anchoring device comprising:
   stator magnets and a rotor core positionable each in respect to the other in repulsion during activation of the anchoring device, and in attraction during deactivation of the anchoring device,
   a ferromagnetic crown for short circuiting the magnetic flux arising from said stator magnets and a rotor magnet during deactivation of the anchoring device,
   at least a first and a second collector pole defining a work surface for anchoring a ferrous part,
   the magnetic flux being circuited during activation of the anchoring device through said ferrous part, and
   a monolithic ferromagnetic block, whereon a housing for said stator magnets, a housing for said rotor core, said ferromagnetic crown and at least said first and second collector poles are formed in one single piece.

2. A manual magnetic anchoring device according to claim 1, wherein said housing for the stator magnets is in the form of a first and second groove, symmetrically originating from respective first and second openings formed longitudinally at a preset height of the opposite lateral surfaces of said monolithic block for housing a first and second permanent magnetic element.

3. A manual magnetic anchoring device according to claim 2, wherein said first and second grooves extend inside said monolithic block at a predetermined acute angle in relation to said work surface.

4. A manual magnetic anchoring device according to claim 2, wherein said first and second grooves extend inside said monolithic block and have edges at the lateral surfaces parallel to said work surface.

5. A manual magnetic anchoring device according to claim 2, wherein said first and second collector poles are arranged symmetrically on a right-hand and respectively left-hand lower portion of said monolithic block and are enclosed within a roughly triangular area bordered by said rotor core and said permanent magnetic elements.

6. A manual magnetic anchoring device according to claim 1, wherein said housing for the rotor core has an upper extension in order to minimize the passage section for this part of magnetic flux which during activation of the device try to close itself through the ferromagnetic portion of said block comprised between the inner ends of the stator magnets housing.

7. A manual magnetic anchoring device according to claim 1, wherein said first and second collector poles at least are in the form of a first and second pole piece defined by the portions of said monolithic block bordered above by said housing for said rotor core and by said housing for said stator magnets.

8. A manual magnetic anchoring device according to claim 7, wherein said first and second pole pieces are in contact laterally in a point below said housing for the rotor core.

9. A manual magnetic anchoring device according to claim 7, wherein said first and second pole pieces are disjoined laterally.

10. A manual magnetic anchoring device according to claim 1, wherein said ferromagnetic short circuiting crown is defined by the upper portion of said monolithic block bordered below by said housing for said stator magnets.

11. A manual magnetic anchoring device according to claim 1, wherein said rotor core is formed by a ferromagnetic cylinder wherein a through groove has been formed longitudinally for housing said rotor magnet.

12. A manual magnetic anchoring device according to claim 1, wherein said rotor core is formed by two semi-cylindrical caps between whose flat lateral surfaces said rotor magnet is placed and fixed.

13. A manual magnetic anchoring device according to claim 1, wherein the magnetic power supplied by said rotor magnet is set above that supplied by said stator magnets in order to enable commutation of the anchoring device through rotations of the control lever of less than 180 degrees.

14. A manual magnetic anchoring device according to claim 1, wherein the type and/or the quantity of the magnetic material forming the stator magnets is different from the magnetic material forming the rotor magnet.

15. A manual magnetic anchoring device according to claim 1, wherein the stator magnet and/or the permanent magnetic part of the rotor core is made with a mixture of different magnetic materials.

16. A manual magnetic anchoring device comprising:
   stator magnets and a rotor core positionable each in respect to the other in repulsion during activation of the anchoring device, and in attraction during deactivation of the anchoring device,
   a ferromagnetic crown for short circuiting the magnetic flux arising from said stator magnets and a rotor magnet during deactivation of the anchoring device,
   at least a first and a second collector pole defining a work surface for anchoring a ferrous part,
   the magnetic flux being circuited during activation of the anchoring device through said ferrous part, and
   a monolithic ferromagnetic block, whereon a housing for said stator magnets, a housing for said rotor core, said ferromagnetic crown and at least said first and second collector poles are formed in said monolithic block,
   wherein said housing for the rotor core is in the form of a cylindrical groove longitudinally extending towards the interior of said monolithic block starting from a substantially central portion of the front wall of said monolithic block.

* * * * *